US009073695B2

(12) United States Patent
Lukes et al.

(10) Patent No.: US 9,073,695 B2
(45) Date of Patent: Jul. 7, 2015

(54) ASYMMETRIC ARTICLE HANDLING AND ORIENTATION

(71) Applicant: R. A. Jones & Co. Inc., Covington, KY (US)

(72) Inventors: Matthew R. Lukes, Independence, KY (US); Jeff Williams, Cincinnati, OH (US); Jeffrey D. Wintring, Florence, KY (US)

(73) Assignee: R. A Jones & Co., Covington, KY (US)

( * ) Notice: Subject to any disclaimer, the term of this patent is extended or adjusted under 35 U.S.C. 154(b) by 160 days.

(21) Appl. No.: 13/872,454

(22) Filed: Apr. 29, 2013

(65) Prior Publication Data

US 2013/0284560 A1    Oct. 31, 2013

Related U.S. Application Data

(60) Provisional application No. 61/640,143, filed on Apr. 30, 2012.

(51) Int. Cl.
*B65G 17/32* (2006.01)
*B65G 47/24* (2006.01)
(Continued)

(52) U.S. Cl.
CPC .............. *B65G 17/32* (2013.01); *B65G 47/244* (2013.01); *B65G 17/02* (2013.01); *B65B 35/58* (2013.01);
(Continued)

(58) Field of Classification Search
CPC ...... B65G 17/32; B65G 47/244; B65G 47/24; B65G 2201/0261; B65G 17/02; B65B 35/58; B65B 43/60; B65C 9/06
USPC ....................... 198/377.1, 394, 382, 383, 416, 198/377.07–377.09, 465.1, 617, 867.11
See application file for complete search history.

(56) References Cited

U.S. PATENT DOCUMENTS 4,664,248 A    5/1987  Goodman et al.
5,417,318 A *  5/1995  Mizuta et al. ................. 198/383
(Continued)

FOREIGN PATENT DOCUMENTS

| CA | 2248565 A1 | 3/2000 | |
|---|---|---|---|
| JP | 4590021 B1 * | 12/2010 | ............ B65G 47/14 |
| WO | 2010007159 A1 | 1/2010 | |
| WO | 2011142337 A1 | 11/2011 | |

OTHER PUBLICATIONS

International Searching Authority, Search Report and Written Opinion Issued in Corresponding International Application No. PCT/US2013/038731 dated Jul. 22, 2013, 12 pages.

*Primary Examiner* — Mark A Deuble
(74) *Attorney, Agent, or Firm* — Wood, Herron & Evans, LLP

(57) ABSTRACT

An asymmetric article-carrying puck is driven by a linear star conveyor through an angular rotation orienting section to orient the pucks and articles therein irrespective of random initial orientation. In one embodiment, an upper puck plate carries the article while a separated lower puck plate defines a rotational orienting circular gear rack with a rotation-stopping bridge, separating ends of the rack and inclined from a base of one end tooth in the rack to a crest of another end tooth in the rack. The lower puck plate can be a combination of two circular plates with the circular gear rack interposed therebetween and within the periphery of the circular plates. Pucks can be accumulated in mutual engaged positions and separated by the linear star into preselected pitch while transported and turned. Integral pucks can be used. The structural details and methods are disclosed.

11 Claims, 20 Drawing Sheets

(51) Int. Cl.
*B65G 47/244* (2006.01)
*B65G 17/02* (2006.01)
*B65B 35/58* (2006.01)
*B65C 9/06* (2006.01)
*B65B 43/60* (2006.01)
*B65C 9/00* (2006.01)

(52) U.S. Cl.
CPC ........... *B65C 9/06* (2013.01); *B65G 2201/0261* (2013.01); *B65G 47/24* (2013.01); *B65C 2009/0003* (2013.01); *B65B 43/60* (2013.01)

(56) References Cited

U.S. PATENT DOCUMENTS

| | | | | |
|---|---|---|---|---|
| 5,484,052 | A * | 1/1996 | Pawloski et al. | 198/867.05 |
| 5,579,890 | A * | 12/1996 | Harris | 198/377.1 |
| 5,941,366 | A * | 8/1999 | Quinlan et al. | 198/465.1 |
| 6,308,816 | B1 * | 10/2001 | Bankuty et al. | 198/395 |
| 6,343,690 | B1 * | 2/2002 | Britton et al. | 198/867.06 |
| 8,047,359 | B2 * | 11/2011 | Fellows et al. | 198/867.11 |
| 8,695,791 | B2 * | 4/2014 | Ohman | 198/867.01 |
| 8,739,964 | B2 * | 6/2014 | Ek | 198/803.13 |
| 8,794,432 | B2 * | 8/2014 | Ek | 198/867.13 |

* cited by examiner

ASYMMETRIC ARTICLE HANDLING AND ORIENTATION

PRIORITY CLAIM

This case is based on provisional patent application 61/640,143 filed Apr. 30, 2012, priority of which is claimed.

FIELD OF THE INVENTION

This invention relates to article handling and more particularly to the handling of asymmetric articles such as containers, work pieces, or other articles as they are filled, sealed, labeled, inspected and packaged. With more particularity, this invention relates to apparatus and methods for handling asymmetric containers on which such operations might be formed when article orientation is significant to the operation. While this invention is described in terms of its application to containers or packages, for example, the invention has application to broader article handling apparatus and methods where such orientation is necessary or preferred.

BACKGROUND OF THE INVENTION

It is known to perform particular operations on asymmetric articles which require the article to be oriented in a particular disposition when the operation is performed. In particular certain operations such as label printing, cartoning and the like require specific article orientation about the vertical axis of the article.

Particularly, in view of packaging into cartons articles which have asymmetric features present the need for specific orientation for handling.

In one known process articles are carried in a carrier known as a "puck" which receives and holds the articles for handling and motion through the process. Such pucks are generally rectangular in shape with sides elongated in a direction of travel. While such flat-sided pucks hold the articles in one orientation, handling of the pucks is problematic due to their shape and external configuration. For example, while the pucks might be accumulate, that requires they be lined up end-to-end and thus a very long accumulator apparatus. They cannot be accumulated en masse and randomly as the rotation and orientation around a vertical access is then random and the desired orientation of the articles is lost. Re-orientation is complicated by the straight sided pucks.

Moreover, conveying or transporting rectangular pucks is problematical. The pucks skew, jam or otherwise generate orientation problems.

Another known process for article orientation is described in U.S. Pat. No. 4,664,248, incorporated herein by reference for background purposes. That patent shows a carrier having a recessed tooth assembly with end teeth on opposite ends of an aligning flat and conveyed by an underlying conveyor.

Puck transfer is by frictional bias from the underlying conveyor and the pucks are not spaced by nor positively transferred by the conveyor. A side rack has teeth at a decreasing tooth pitch, and the pucks are blown against an alignment rail.

Accordingly, it is desired to provide improved article handling structure providing smoother, gentler and more positive puck control including positively driving the puck at desired pitch through a rotationally orienting section. It is further desired to provide apparatus and methods for handling asymmetric articles, in a way to repeatably, consistently and accurately orient the articles through transport at high speeds of production lines.

A further objective of the invention is to provide apparatus and methods for efficiently and randomly accumulating asymmetric articles and then orienting such articles after accumulation.

A further objective of the invention has been to provide improved apparatus and methods for transporting and orienting asymmetric articles.

A further objective of the invention has been to transport, carry and orient asymmetric articles through or in a plurality of stations or filling, sealing, accumulating, labeling, dating, inspecting or other processes wherein the articles, prior to or after such processes, are desirably angularly oriented relative their vertical axis.

SUMMARY OF THE INVENTION

In a preferred embodiment of the invention, a circular puck has an upper annular plate with an internal opening having the same asymmetric configuration of an article which is received therein. A lower annular puck plate comprises an outer peripheral area. A recessed rack of a plurality of gear-like teeth, wherein the rack has two ends separated by a bridge of smooth, flat configuration from one end of the rack to the other, is disposed just within the periphery. Thus, the outermost circular periphery of the lower annular puck plate has, just inwardly disposed, a plurality of recessed teeth extending in a circular path having ends joined by the bridge. The upper plate and lower plate are spaced apart by elongated spacers and the upper and lower plates are preferably arranged concentrically about a vertical axis, preferably the same as the vertical axis of the article.

Accordingly, an article in the upper plate is held in one angular position about the vertical axis with respect to the teeth and bridge in the lower puck plate. When the lower puck plate is turned, the upper puck plate with the held article is turned likewise, in register.

A handling system includes a puck feed lane wherein pucks are lined up in random angular position with respect to the vertical axis of each. An elongated gear rack, preferably as long as or slightly longer than the teeth rack and bridge of the lower puck plate, is oriented in the path of the periphery of the pucks, which are carried along, preferably slightly spaced, by a linear star conveyor. Such a conveyor preferably has a plurality of projections providing both cup separation features for a desired pitch, and receptacles for holding the articles and transporting them in a downstream direction. As an example, such a linear star conveyor is shown and described in U.S. Patent Application Ser. No. 61/628,753 filed Nov. 4, 2011 and incorporated herein by reference.

When the pucks are transported and moved into engagement with the elongated rack, its teeth engage the circular teeth in the puck rack and the puck, together with the upper puck plate and article are turned as the puck and article move downstream.

This rotation continues until such time as the bridge surface, between the puck rack ends, is rotated to confront the teeth of the elongated rack 42. At this time, downstream puck motion continues, but the puck and article do not further rotate and remain in the angular position determined by the sliding engagement of the bridge on the crests of the teeth of the elongated rack.

The bridge is inclined in a radially outward direction and extends rearwardly from a base of a tooth at one end of the puck rack to the crest of a partial tooth at the other end of the rack. This inclination provides a gentle engagement of the puck's tooth rack with that of the elongated rack, while it is the final engagement of the bridge surface at the crest of the trailing tooth which stops the puck rotation and facilitates further sliding of the puck downstream.

Downstream of the elongated rack in the puck path is a flat slide or guide which has a guide surface in the same extension of the tooth crests of the elongated rack. This guide engages the puck bridge and retains the puck (and article) in its angular position as it moves further along its transport path, properly oriented for labeling, dating, inspection or other functions.

In addition, and in response to a system circumstance such as a cycle stop, for example, it will be appreciated that these circular pucks can be randomly accumulated in close abutting engagement, with one another, in bulk configuration similarly to that of beverage cans in a beverage cartoning configuration where the cans are then funneled into single lanes for further handling. No special guiding or feature configuration is necessary to align the circular pucks in single file for handling by the linear star conveyor, which separates them into desired pitch spacing and drives them forward.

Once the system stop is cleared, accumulated pucks with their articles can be funneled into and transported in a single line, with desired rotational orientation generated by a path-side rack as noted above. This can occur once or multiple times in a container or other article system such as before or after filling, after accumulation, before labeling, before dating, before inspection or at any desirable time where the pucks pass an elongated toothed rack in the system.

It will be appreciated that regardless of the angular position of puck and article as the puck engages a path side rack, the puck and article is angularly rotated and thus oriented to a final angular position corresponding to the engagement of the bridge of the puck with the crests of teeth in the elongated rack. That orientation can then be retained by the engagement of the bridge with an elongated guide or the engagement of other flats on the puck with guides extending along the puck path. A flat on the periphery of an upper puck plate, aligned with the bridge, may be engaged by an additional elongated guide once the puck is oriented for additional puck stability.

In addition, it will be appreciated that the pucks of the invention are not necessarily of two spaced puck plates, but that the invention also contemplates round pucks of unitary configuration or a single component puck body having an internal configuration to hold an asymmetric article therein and a recessed tooth rack, for example to cause selective rotation according to the description herein. Such pucks may be thin or of relatively taller height, or pucks according to the invention herein may be comprised of more than two puck plates. These and other objectives and advantages will become readily apparent from the following written description and from the drawings in which:

DETAILED DESCRIPTION OF THE INVENTION

Turning now to the FIGS., it is appreciated that like parts have like numerical and alphabetical designations through the Figures. A puck 10 according to a preferred embodiment of the invention is sometimes referred to as an article carrier. In this description of a preferred embodiment, puck 10 is particularly configured to accept an asymmetric article which may be rounded or of any shape but with at least one feature such as a handle, spout or projection extending or projecting from the article (see FIGS. 2 and 6).

Pucks according to this invention may be of unitary, integral configuration, short or tall or of multiple components forming the puck. The pucks are rounded, preferably with a recessed circular gear, and with a feature for holding an asymmetric article therein. Thus articles from wafer-like thinness to taller article such as containers, work pieces or the like are contemplated.

Figure 3:
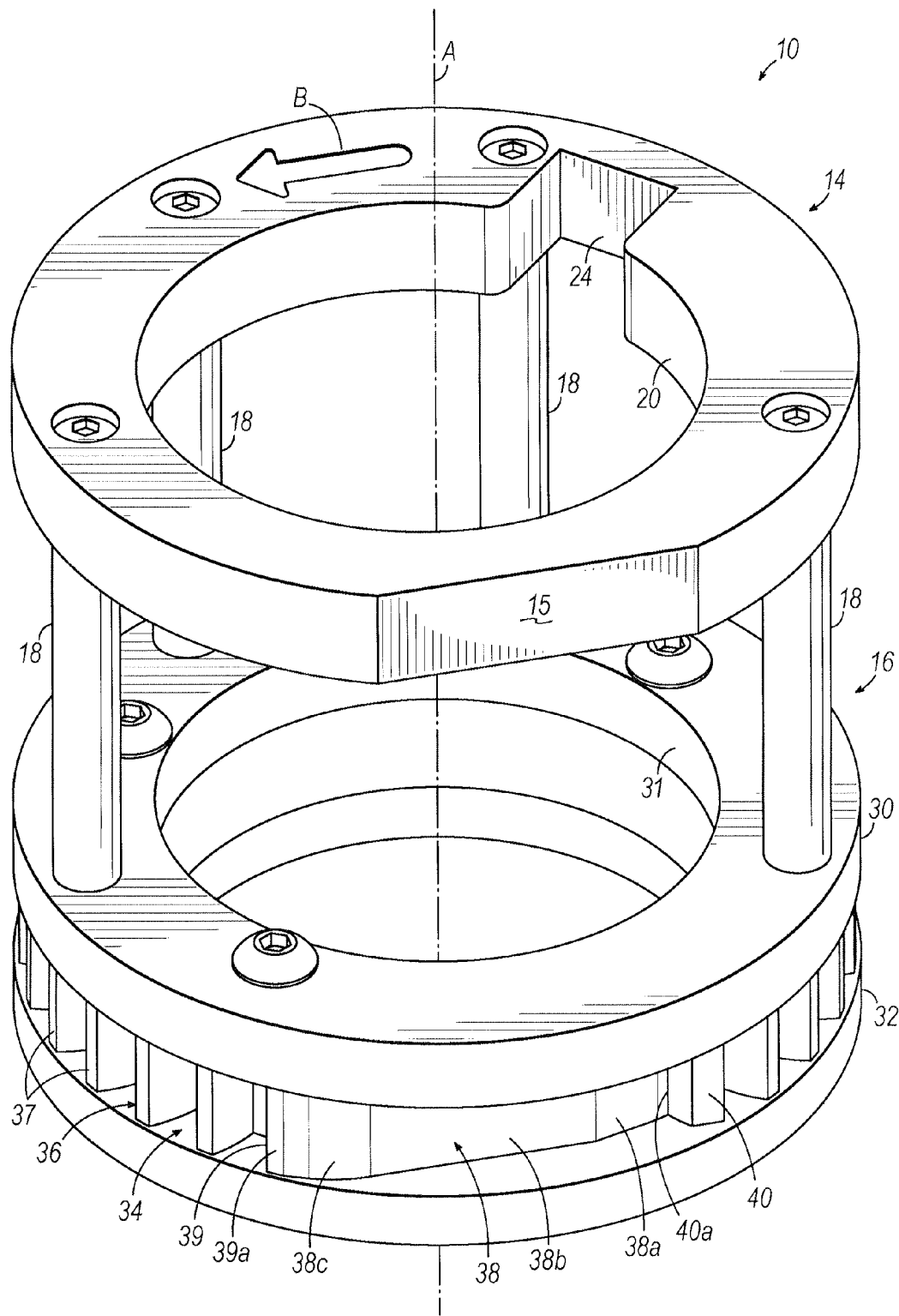
FIG. 3 is a view similar to FIG. 2 but showing the puck slightly rotated about a vertical axis from that in FIG. 2.

Puck 10, however, of one preferred embodiment is further described. Puck 10 includes an upper puck plate 14 and a lower puck plate 16, these plates being spaced apart vertically by spacers 18 and are concentric about a vertical axis A (FIG. 3) also comprising a vertical axis A of an asymmetric article 12.

Figure 2:
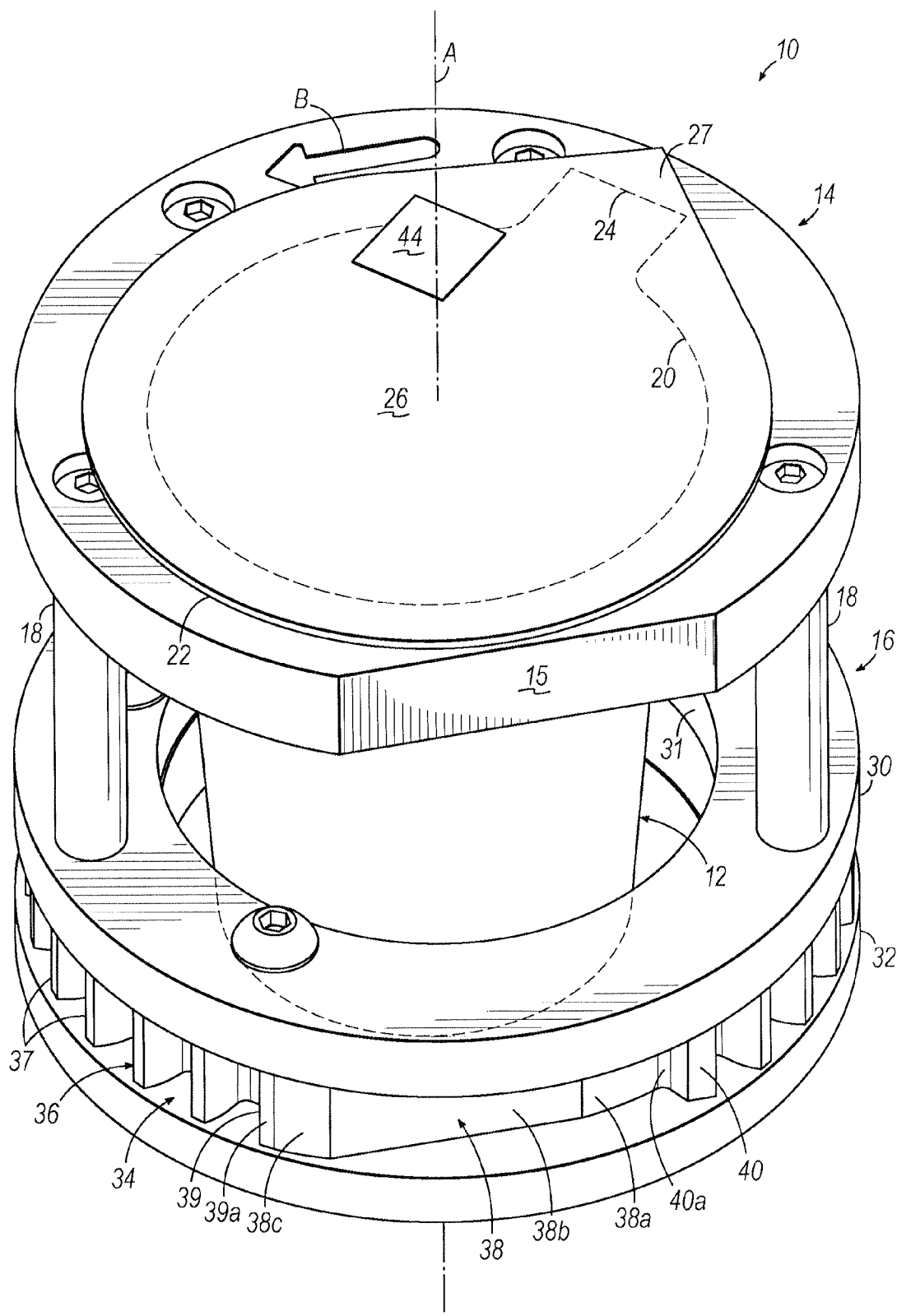
FIG. 2 is an isometric illustration of a puck as in FIG. 1 with an asymmetric article in place.
Figure 6:
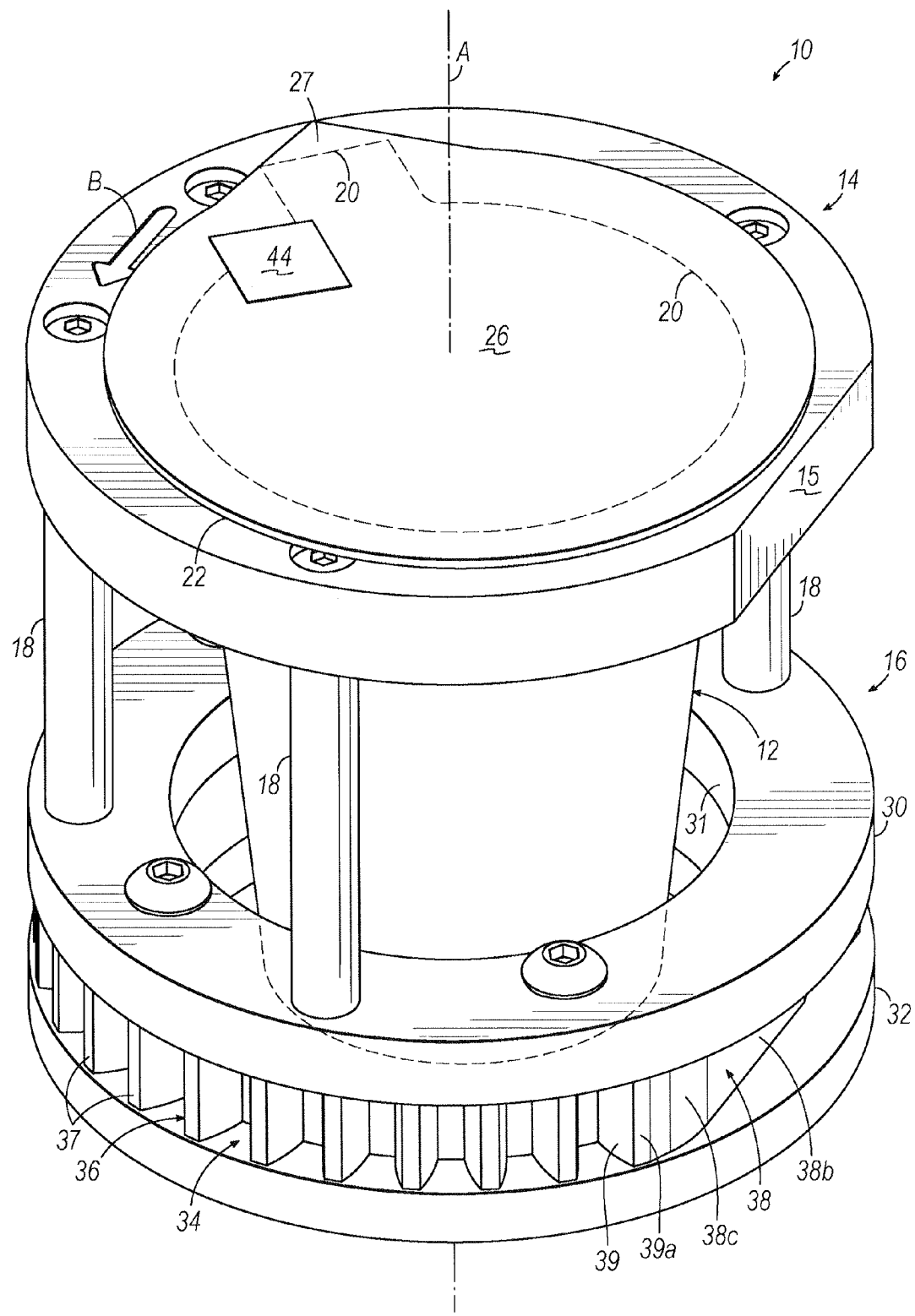
FIG. 6 is a view similar to FIG. 5 but showing the asymmetric article therein.

Upper puck plate 14 has an opening 20 configured to accept an upper portion 22 of article 12 (FIGS. 2 & 6). As shown, portion 22 lies on an upper surface of plate 14 when the upper portion of article 12 is received in opening 20. Opening 20 includes a recess or detent 24 for receiving a feature such as a handle (not shown) extending from article 12 on one side thereof proximate rim portion 22. The extension of the feature from the body of article 12 renders article 12 asymmetric. Once in the upper plate opening 20, the feature is received in recess 24 and the article cannot turn in or with respect to the puck 10. When the puck rotates about axis A, the article 12 rotates with it about the same axis.

Article 12 such as a container, for example, preferably has a top 26 of any suitable material applied thereto with a projecting or tapered portion 27 covering that area which would otherwise be over the feature extending from the article side wall and up to rim 22 thereof.

Figure 1:
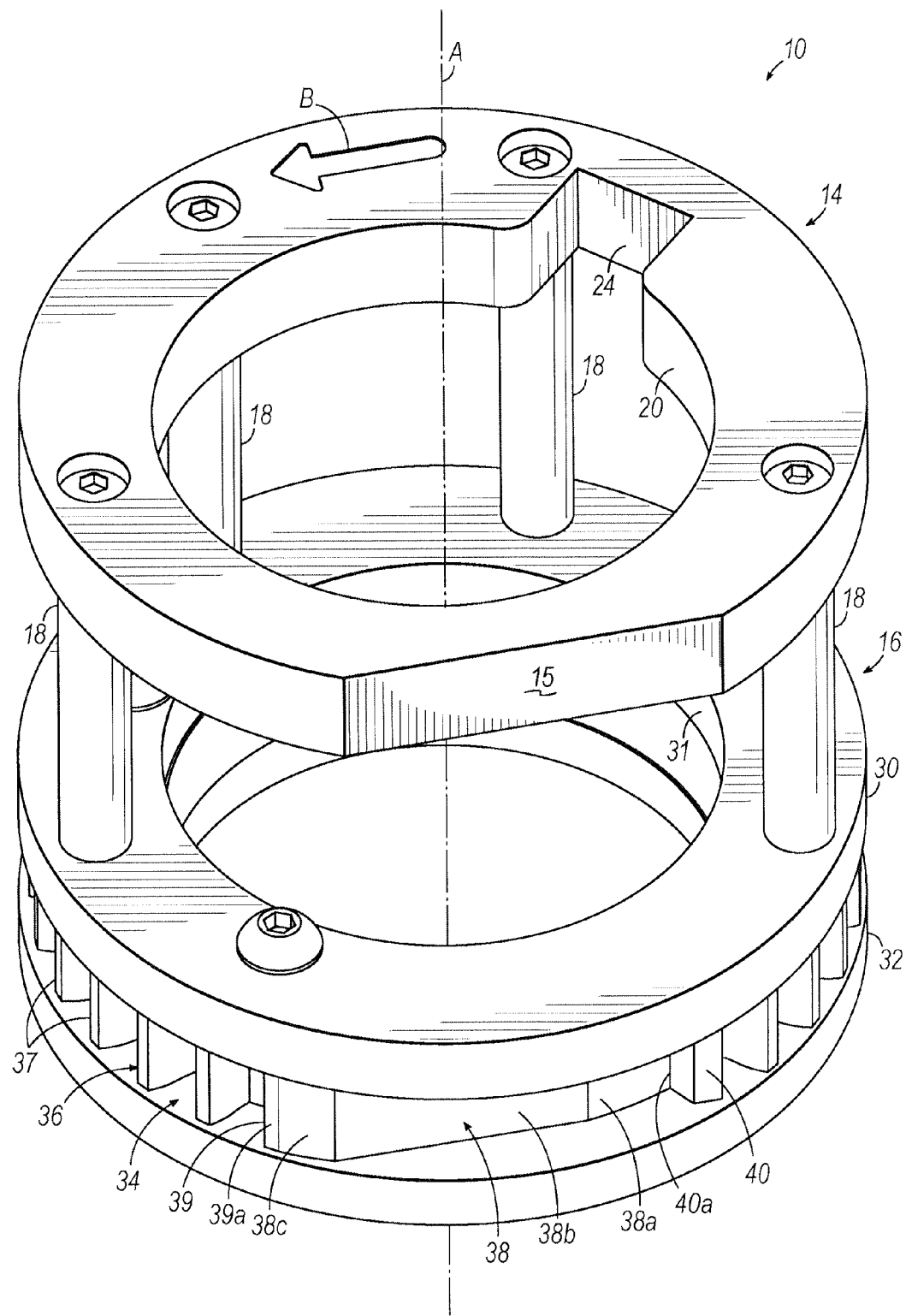
FIG. 1 is an isometric illustration of a puck according to one embodiment of the invention.

Lower puck plate 16, as shown, is comprised of a top circular plate 30, a lower circular plate 32 and an intermediate, recessed toothed gear plate 34 comprising circular gear rack 36 with teeth 37. A bridge 38 extends between partial end tooth 39 and end tooth 40 of circular rack 36 (FIG. 1). Lower puck plate 16 can be integrally formed such as by casting, machining or other suitable process, but in any event comprises a lower puck plate 16 with a plurality of recessed teeth with crests extending radially toward the periphery of puck plate 16, i.e. the outer circumferential surfaces of plates 30,32.

The recessed teeth 37 extend in a circular gear rack 36 around the circumferential portion of puck plate 16 to opposite ends of bridge 38. Note bridge 38 preferably, but not necessarily inclines from a height at the crest of a tooth 39 radially inwardly to the base 40a of tooth 40 This inclination serves to produce a soft or gentle engagement of the bridge 38 with the crests of teeth in the elongated linear rack 42 as be discussed. As the puck 10 rotates, it is engagement of the bridge 38 at the crest of tooth 39 with the crests 63 of teeth 62 of the elongated rack 42 which stops rotation of puck 10.

Details of the bridge 38 are best seen in FIGS. 1-6,8, 10, 12 and others where the bridge 38 preferably extends rearwardly and radially outwardly from a base 40a of a tooth 40 toward the crest 39a of a partial tooth 39.

In addition, and preferably, the bridge includes at least two distinct inclined surfaces 38a, 38b and 38c. The bridge may have further segments defining its outer surface. The outwardly facing surface then of bridge 38 may be formed of several inclined surfaces as shown herein, or in a single inclined or curved surface as it extends from base 40a of tooth 40 outwardly to crest 39a of tooth 39. These bridge surfaces provide a gentle engagement of puck 10 with the rack 42 of section 58 (see below) as the puck rotates.

Moreover it will be appreciated that the slight taper or inclination 38c extending from the crest 39a initiates the puck turning slightly in the clockwise direction (versus the counterclockwise direction) to facilitate the puck alignment bridge 38 in desired alignment with the rack 42. This aids the proper alignment for pucks which may be almost properly aligned as they enter rack 42 but could be slightly over rotated by a very small amount. Thus consistent and accurate orientation is not impaired for pucks in near perfect original alignment as it initially approaches the rack 42. Finally, it will be appreciated that the configuration of the bridge surfaces requires the pucks to be run in only a downstream direction where the orientation rotation caused by rack 42 will only be in a counter clockwise direction (as viewed from above) with only a very slight clockwise rotation for pucks very slightly over-rotated upon initial rack engagement noted above. Attempts at running the system in an opposite direction results in process lock-up due to the bridge configuration. However, the structure can be reversed to opposite hand for generally clockwise rotation where desired.

Reference to lower puck plate 16 refers to the combined structure of plates 30, 32 and circular rack 34. These components, when a composite plate is considered, are held together by through screws as shown in the FIGS.

Lower circular plate 32 may have a solid center, while top circular plate may have a central opening 31 to accommodate an article 12.

Turning to upper puck plate 14, note its periphery is generally circular except, for example, a flat 15 corresponding in angular position to the bridge 38 in lower puck plate 16 and parallel thereto. The flat 15 thus can be guided by an elongated support guide once the puck 10 is angularly properly oriented as described herein.

Finally, note that for clarity and description, an arrow B is placed on the upper surface of upper puck plate 14 in a position where it indicates a direction parallel to the extension of flat 15 (FIG. 1). Once the puck 10 is rotationally oriented, further downstream movement is in a machine direction as then indicated by the arrow B.

Further note that for description, an RFID tag 44 or other label device is placed on the article 12 in a desired location when the puck 10 and article 12 is properly oriented as described herein. This ensures the label or tag is always in the same place on the oriented articles 12 for reading, reviewing and inspection.

Figure 4:
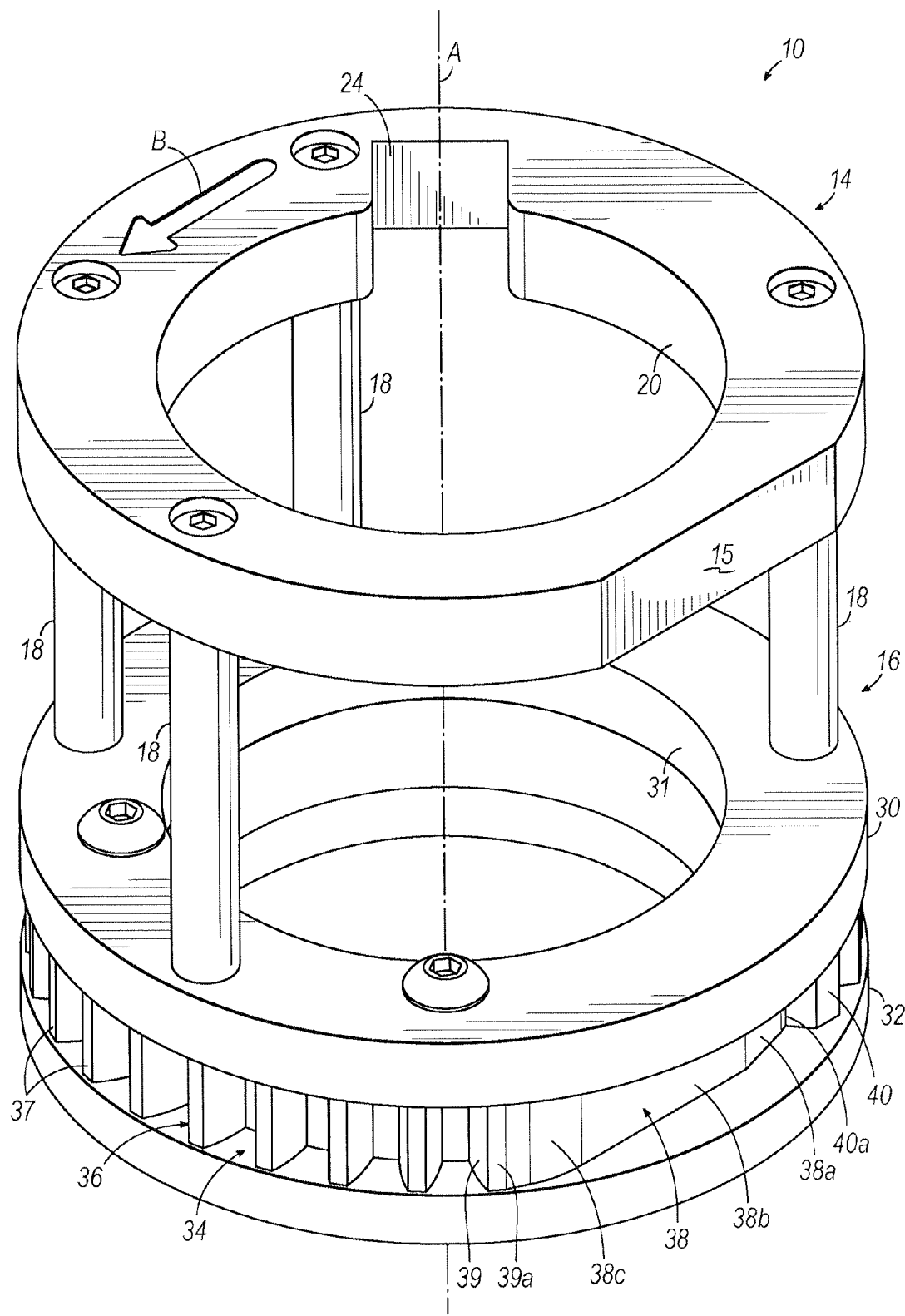
FIG. 4 is an isometric view of the puck of FIGS. 1-3 but rotated further in a counter clockwise direction.
Figure 5:
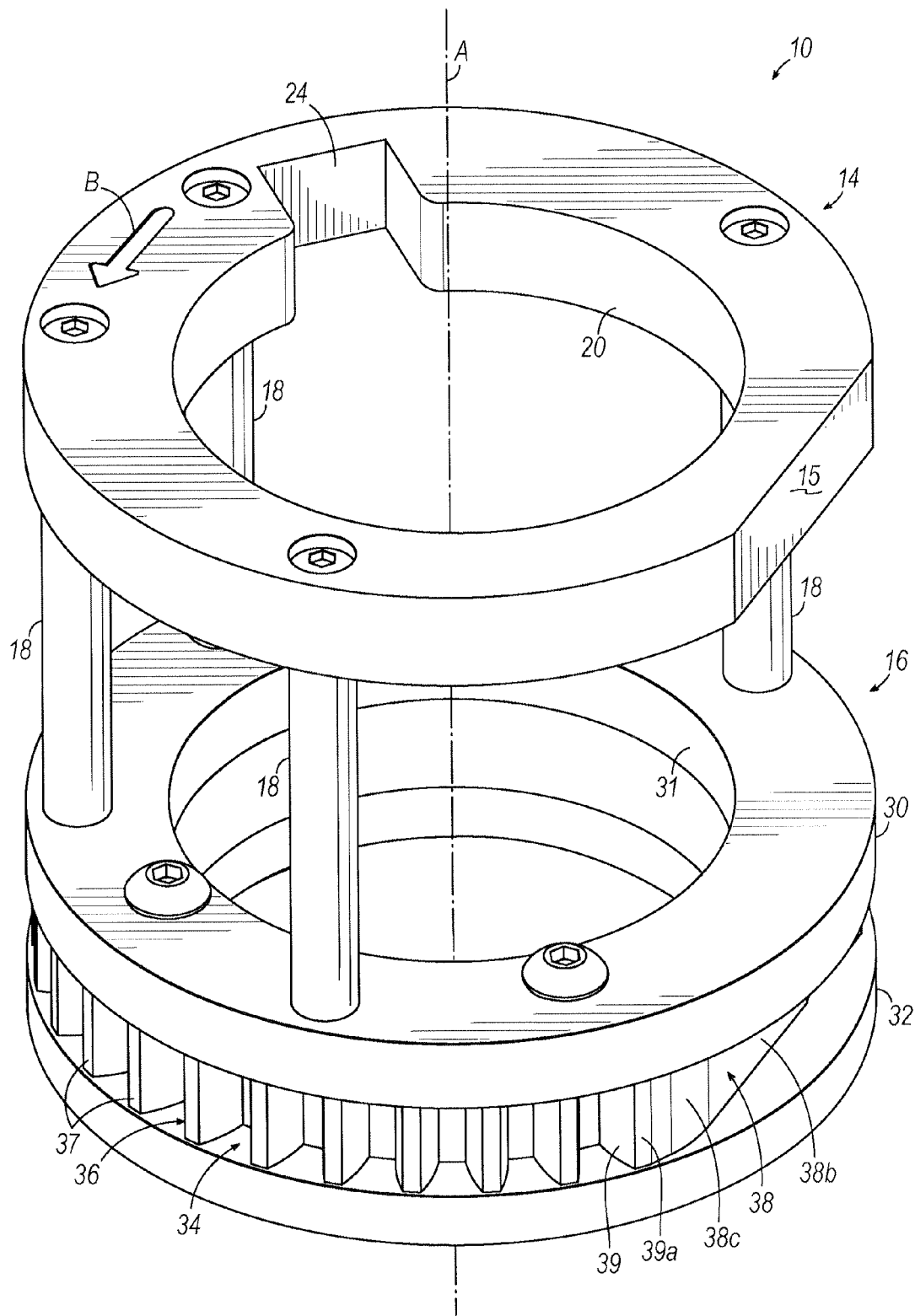
FIG. 5 is a view similar to FIG. 4 but with the puck further rotated in a clockwise direction.

As shown in the various FIG. 4, et seq., pucks 10 are conveyed or transported in a single line in a downstream machine direction such as by a linear star conveyor 50, including a plurality of wedge-like projections 52, each having concave leading and trailing surfaces 53, 54 respectively. A linear star pitch and transport apparatus similar to that described in U.S. Provisional Patent Application Ser. No. 61/628,753 filed Nov. 4, 2011, incorporated herein by reference, may be used.

A leading surface 53 of one wedge 52 forms, with a trailing surface 54 of a preceding wedge 52, a puck pocket 56, each pocket 56 defining a puck receptacle spaced at a desired puck pitch from an adjacent pocket 56. Upstream of the FIGS. (not shown), randomly-oriented pucks 10 are fed to between the linear star 50 and guiderail surface 51, parallel thereto, for positive downstream transport toward the orientation section 58, the extent of which is indicated by the bracket 58 in the Figs. and is consistent with the other figures. Linear star conveyor positively transports the articles downstream at a predetermined pitch, allows them to rotate when they engage the orientation section 58, and continues to transport them downstream when not rotating for orientation.

Section 58 includes a linearly-elongated rack 42 of teeth 62 having crests 63 disposed along crest line 64 (FIG. 4). Crest line 64 is also extended from elongated surface 66 of elongated guide 68 (FIG. 4) as will be discussed below. Preferably, rack 42 is elongated a distance equal to or slightly longer than the combined extent of tooth rack 34 and bridge 38. This ensures that a puck is rotated fully to its desired oriented position regardless of its angular position as it initially enters section 58.

Operation

Operation of the invention is illustrated in FIGS. 7-20. In this regard, note that arrows C in the FIGS. refer, when curved to rotational motion of pucks 10 when the pucks rotate and, when straight, to linear straight motion of pucks 10 when moving downstream but not rotating, while arrow D refers to downstream linear motion of the pucks 10 when that is occurring.

Articles 12 are not shown in the operational FIGS. for clarity of explanation.

Apart from the upper puck plate shown in FIGS. 7-14, these FIGS. demonstrate, that the angular orientation of the pucks 10 as they enter the section 58 has no bearing on the final orientation of pucks 10 as they exit section 58; rather, all are aligned finally in the same orientation independent of their orientation when entering section 58.

Turning to FIGS. 7-14 and 15-19, it will be understood that a puck 10 (represented by circular gear 34 and lower circular plate 32) approaches section 58 in any angular orientation. For purposes hereof, "angular" or "rotation" mean with respect to axis A about which article 12 and the puck 10 rotate.

Once a tooth of circular rack 34 engages teeth 62 of elongated linear rack 42, further downstream motion in the direction of arrow D caused by the movement of linear star 50 driving puck 10 downstream, causes puck 10 to rotate in the direction of arrow C. This continues until the surface of bridge 38 engages the crests 63 of teeth 62 on rack 42 as in FIGS. 11-12. When this occurs, and particularly once that portion of the bridge extending from the crest of tooth 39 engages a crest 63 of a tooth 62, puck 10 can no longer turn about axis A, such rotation being blocked by the engagement of bridge surface at 38 on tooth crests 63. Thereafter, puck 10 moves only in the linear, downstream direction of straight arrows C and D by virtue of the drive in that direction by linear star 50.

Figure 13:
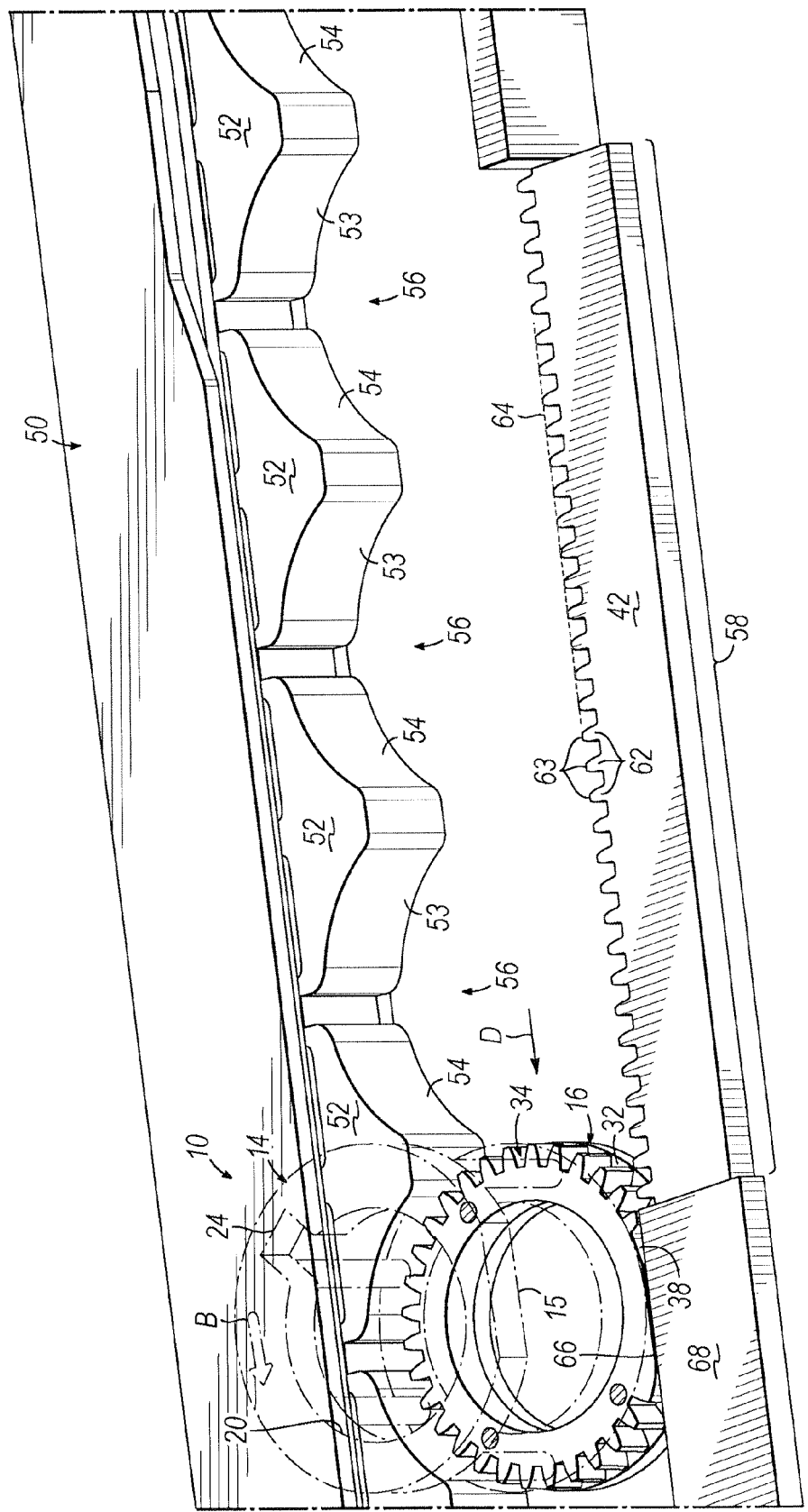
FIG. 13 is an isometric view of the puck of the FIGS. 7-12 but oriented and on the elongated guide downstream of the orientation rack.
Figure 14:
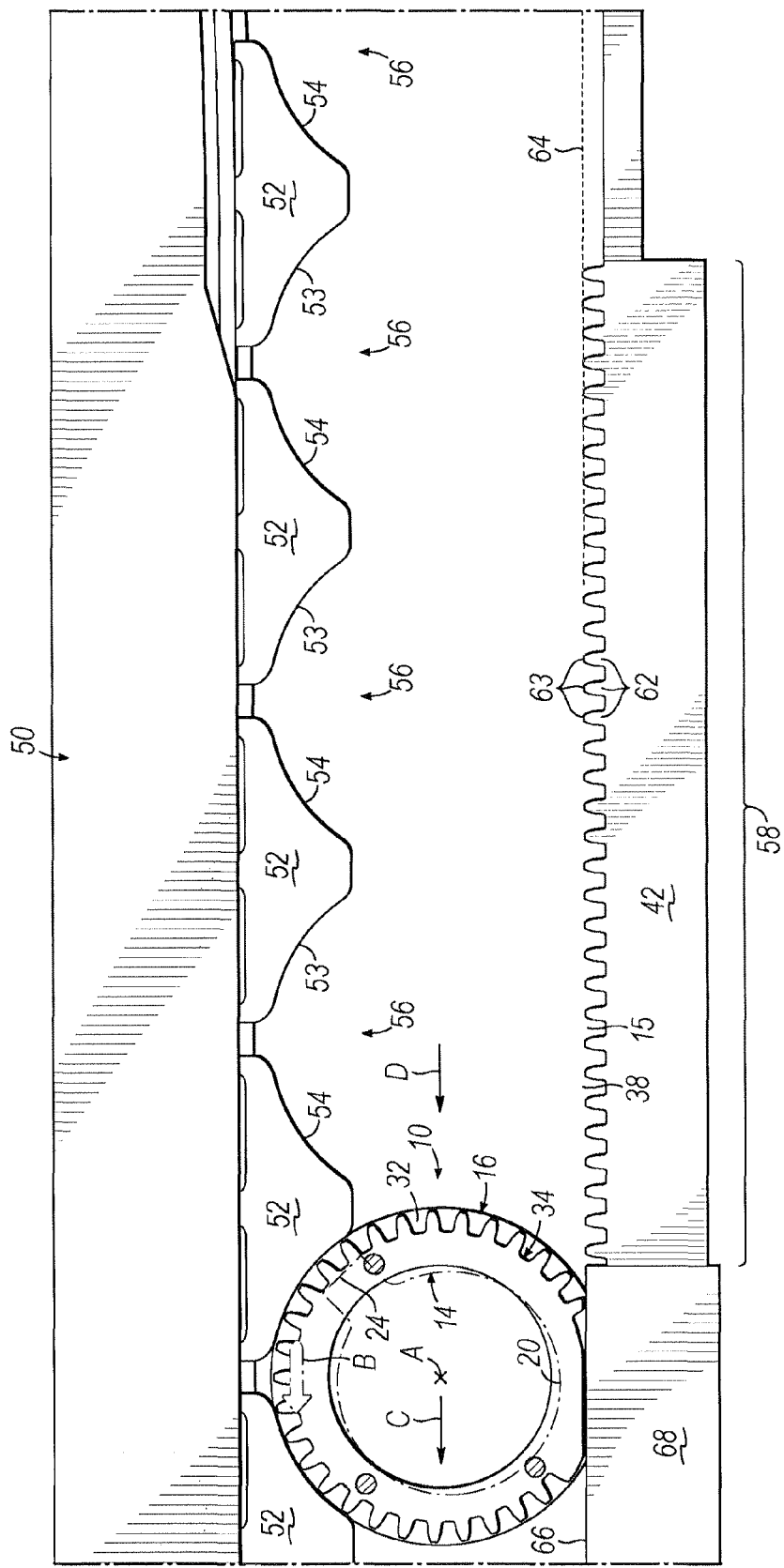
FIG. 14 is a top plan view of the puck of FIG. 13.
Figure 15:
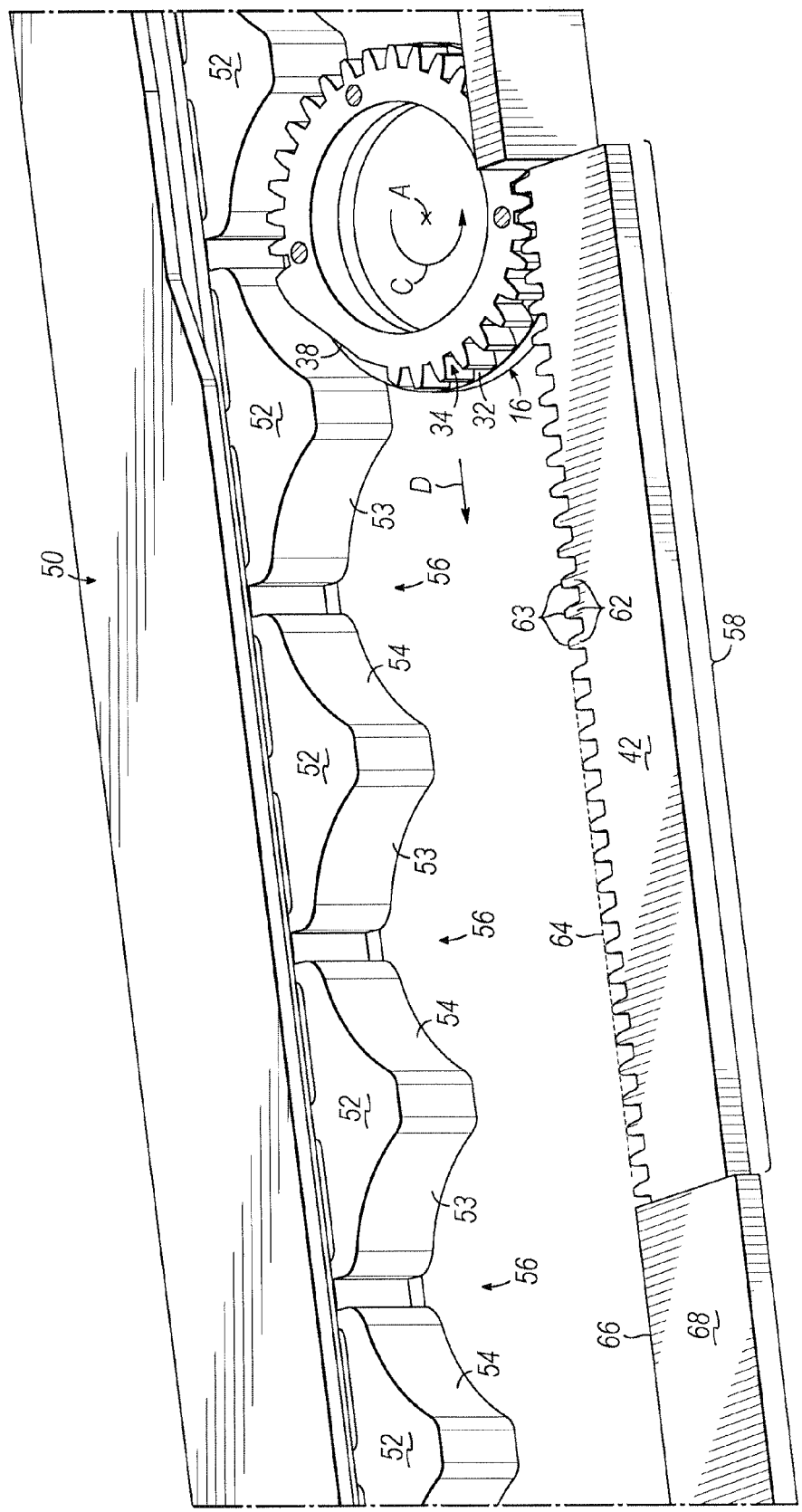
FIGS. 15-19 are partial isometric views of a puck demonstrating a different original angular orientation as the puck moves into the elongated orientation rack, resulting in the same final orientation of pucks of the previous Figures, and where the puck reaches final angular orientation earlier in its motion down the elongated orientation rack.
Figure 16:
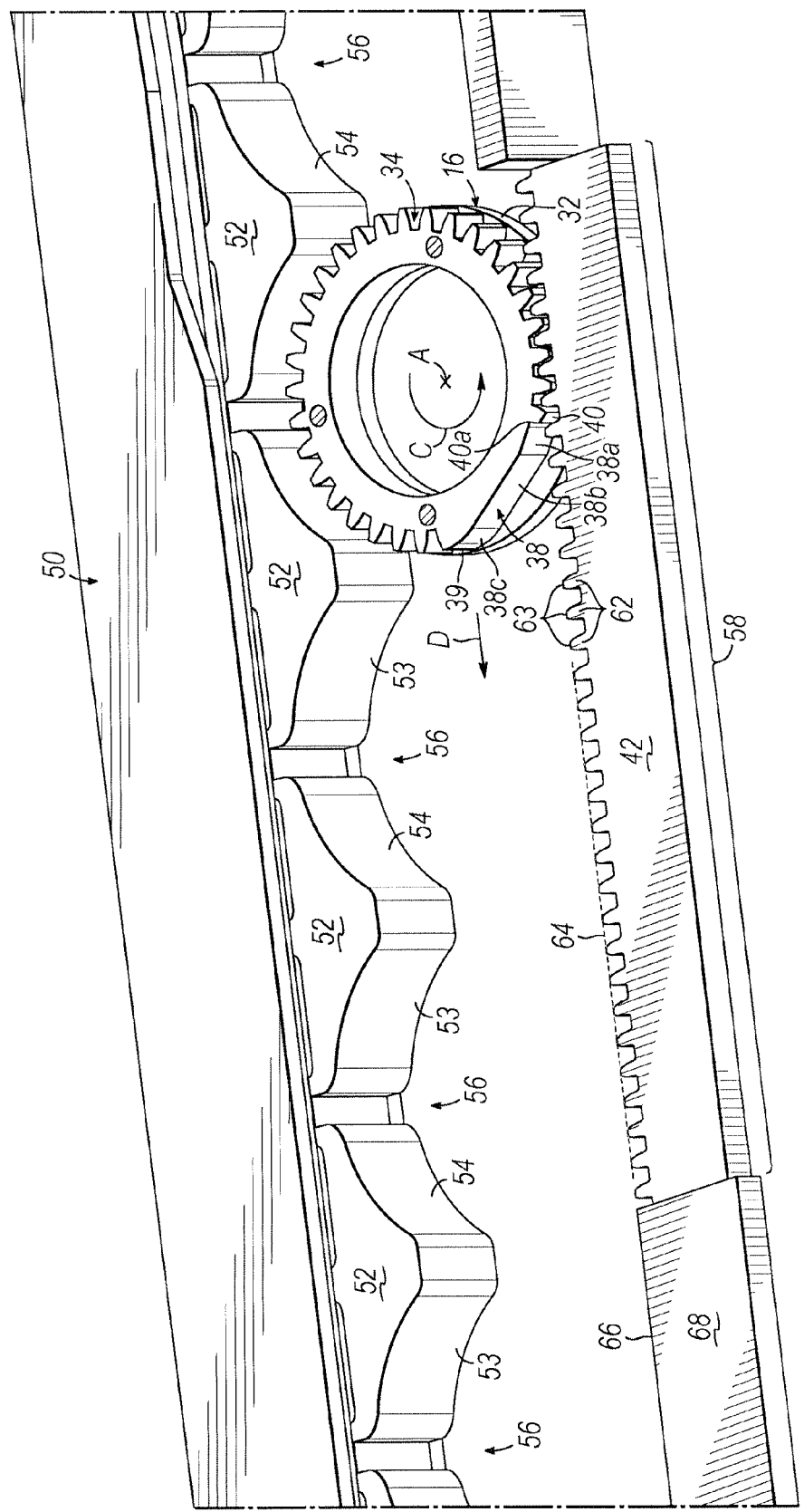
Figure 17:
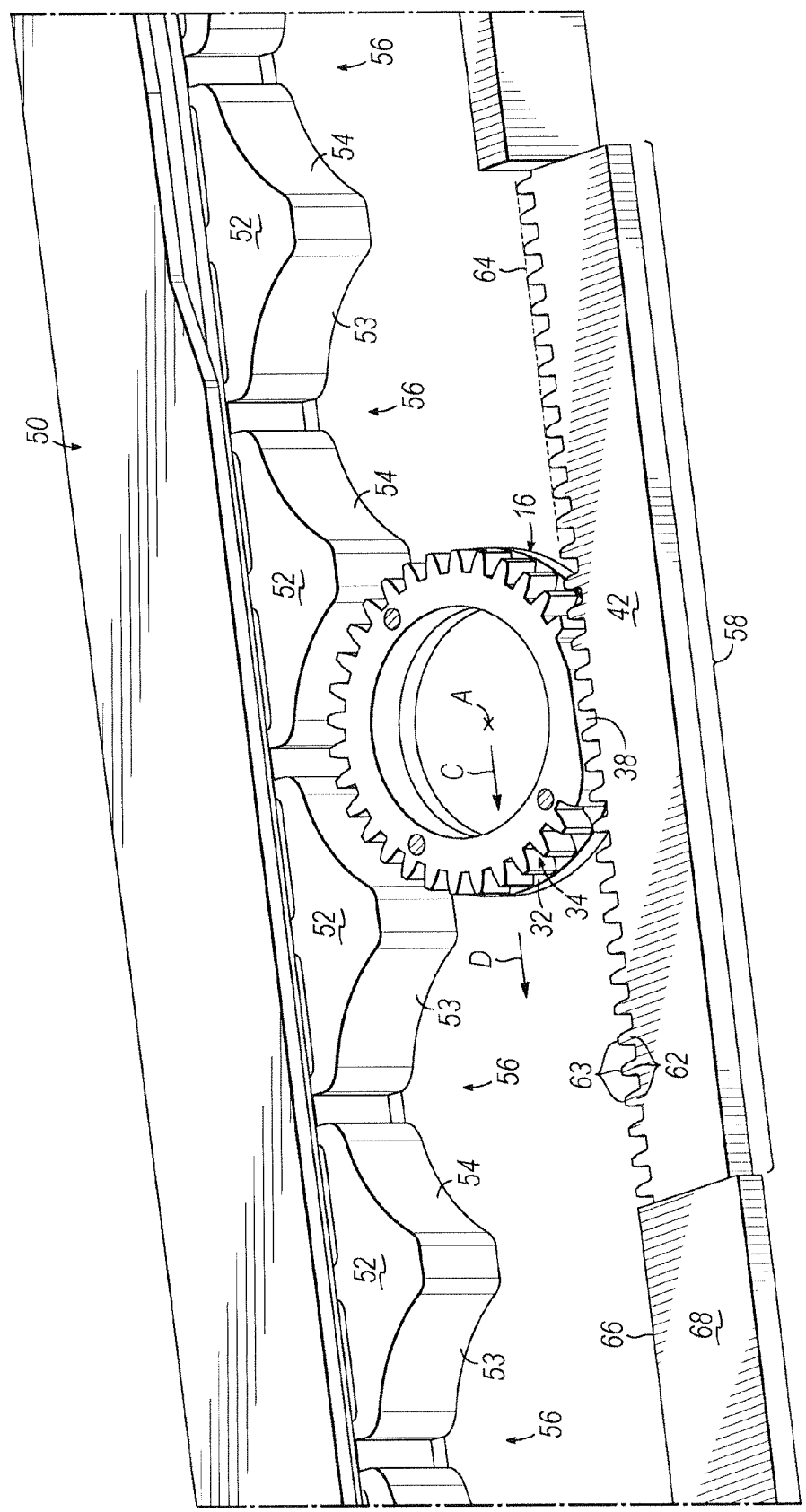
Figure 18:
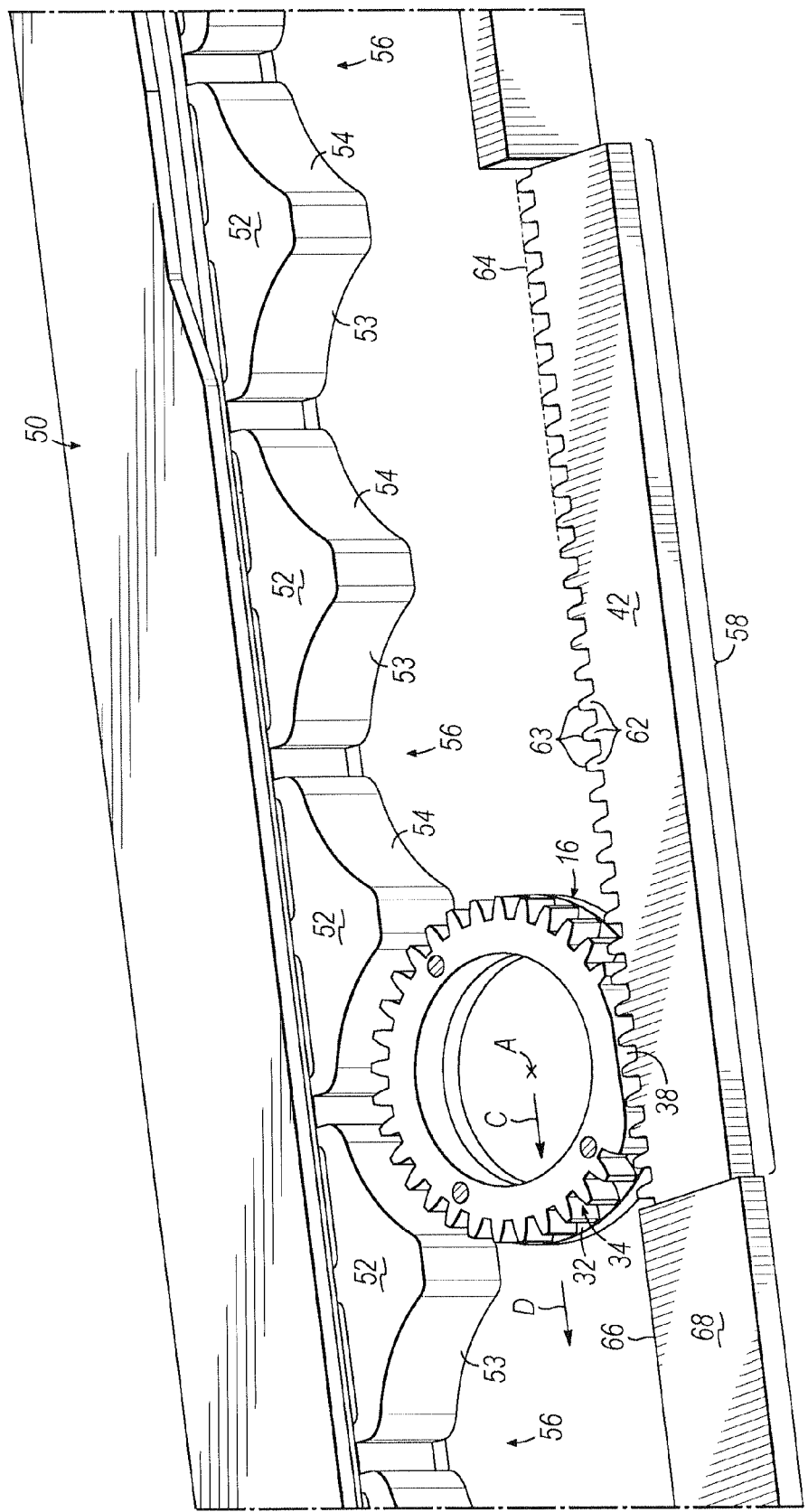
Figure 19:
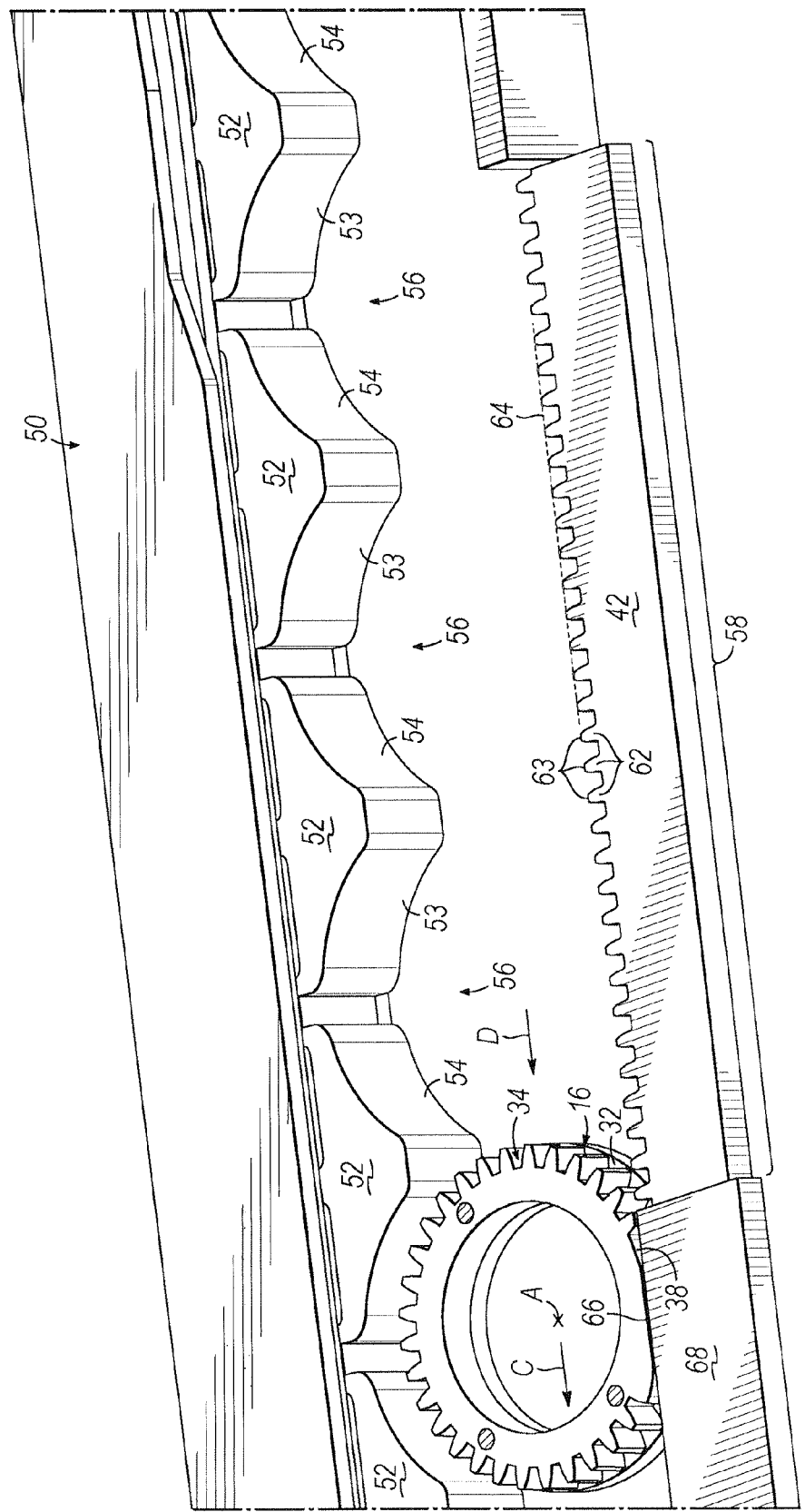

In FIGS. 13-14, puck 10 has moved past engagement in section 58, with bridge 38 sliding along guide surface 66 of guide 68, in the same path of the crest line 64 of crests 63.

In this position, the article 12 has been oriented so that in this embodiment arrow B is aligned parallel to arrows C and D as well as surface 66 and crest line 64 (FIG. 13).

It will be appreciated that preceding engagement of puck 10 with section 58, bridge 38 is randomly oriented.

Figure 7:
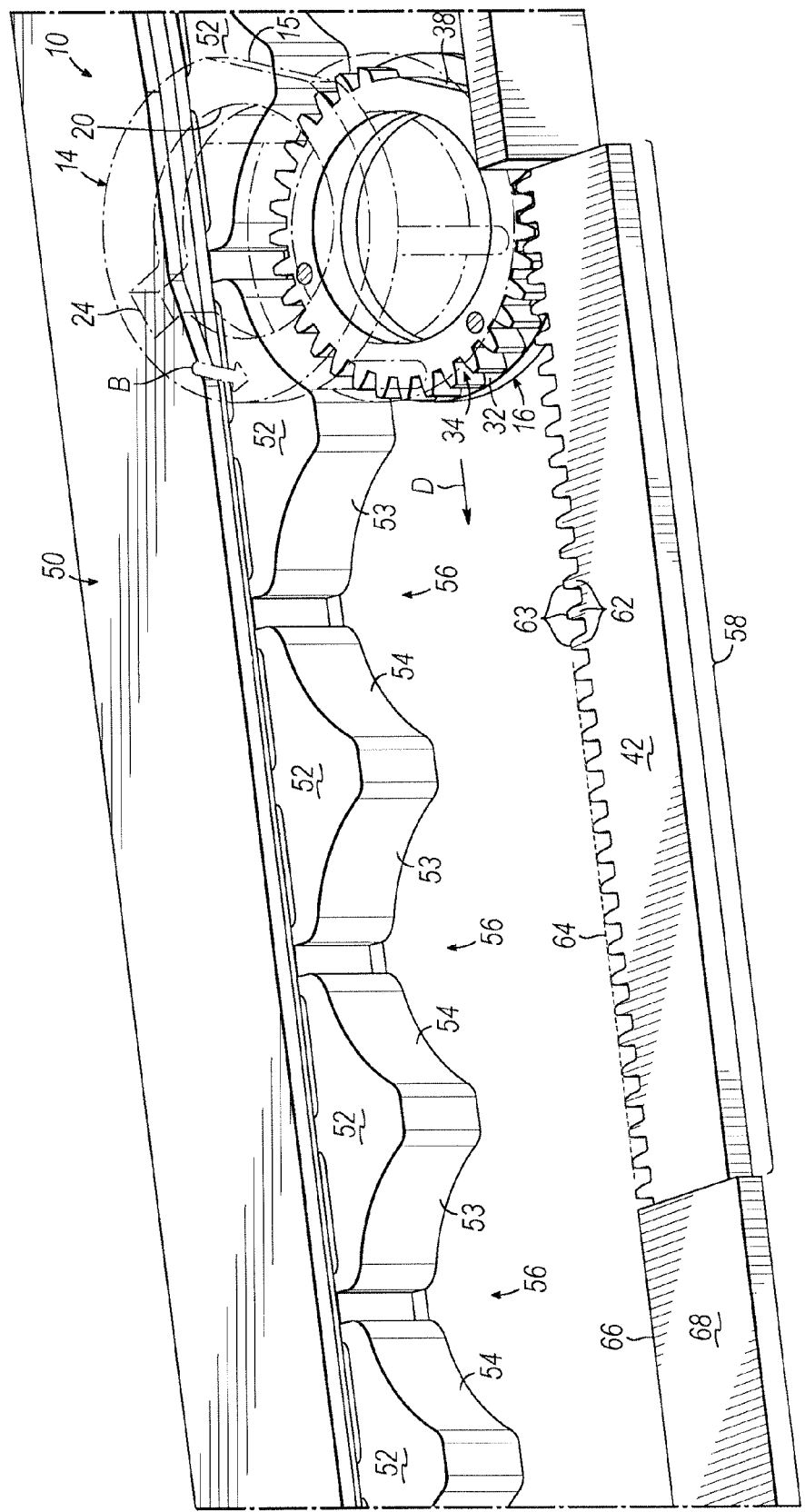
FIG. 7 is an isometric view but showing the puck driven by a linear star conveyor and just engaging teeth of the elongated rack, the upper puck plate transparent for purposes of clarity.
Figure 8:
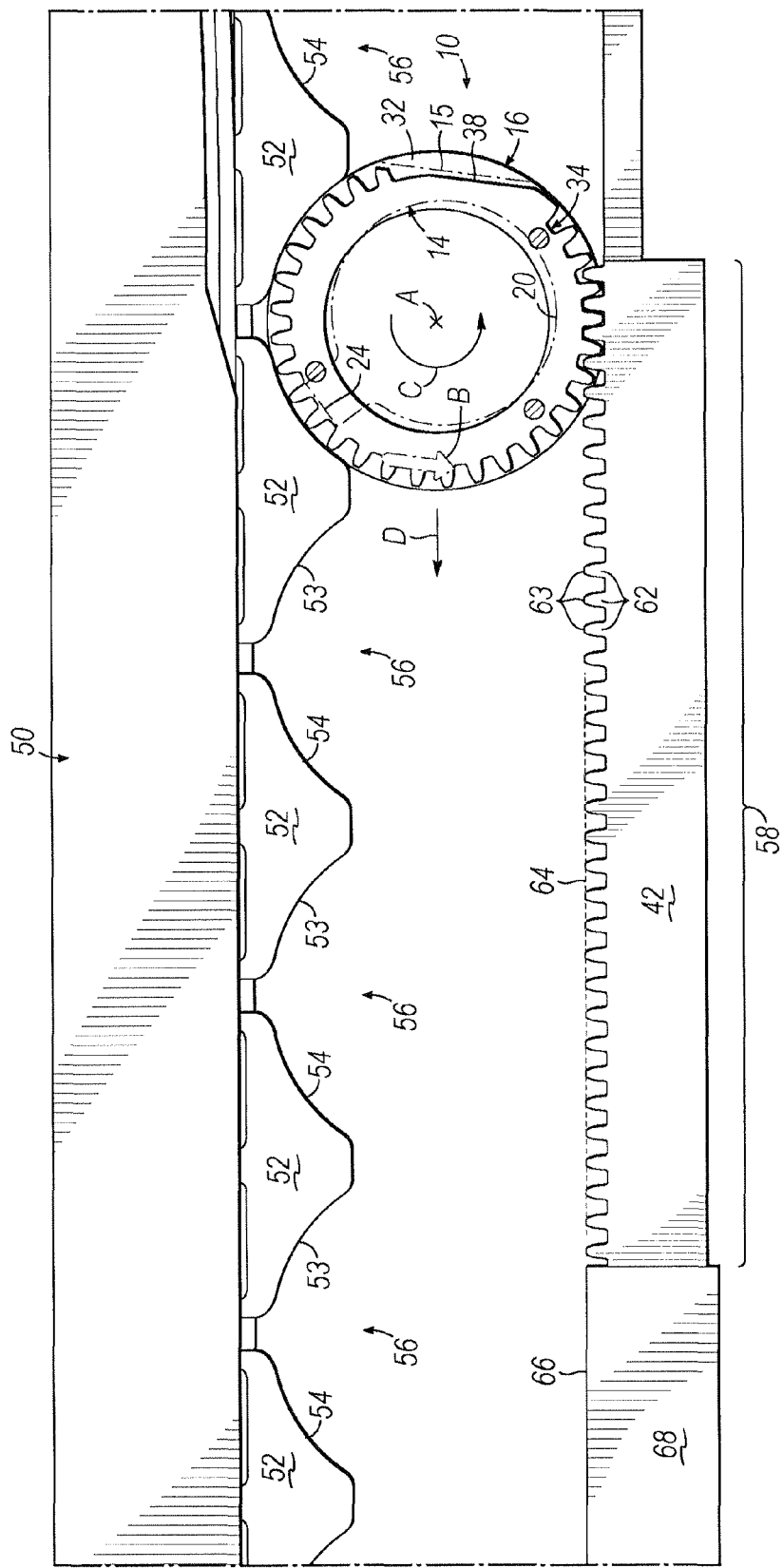
FIG. 8 is a top plan view of the puck of FIG. 7, the elongated rack and the linear star conveyor.

In FIGS. 7-8, teeth 62 have engaged teeth 37. Rotation of downstream movement of puck 10 continues until bridge 38 has engaged crests 63 as in FIGS. 11-12. Thereafter, bridge 38 slides along crests 63, then surface 66 of guide 68, preventing further rotation of puck 10.

Figure 9:
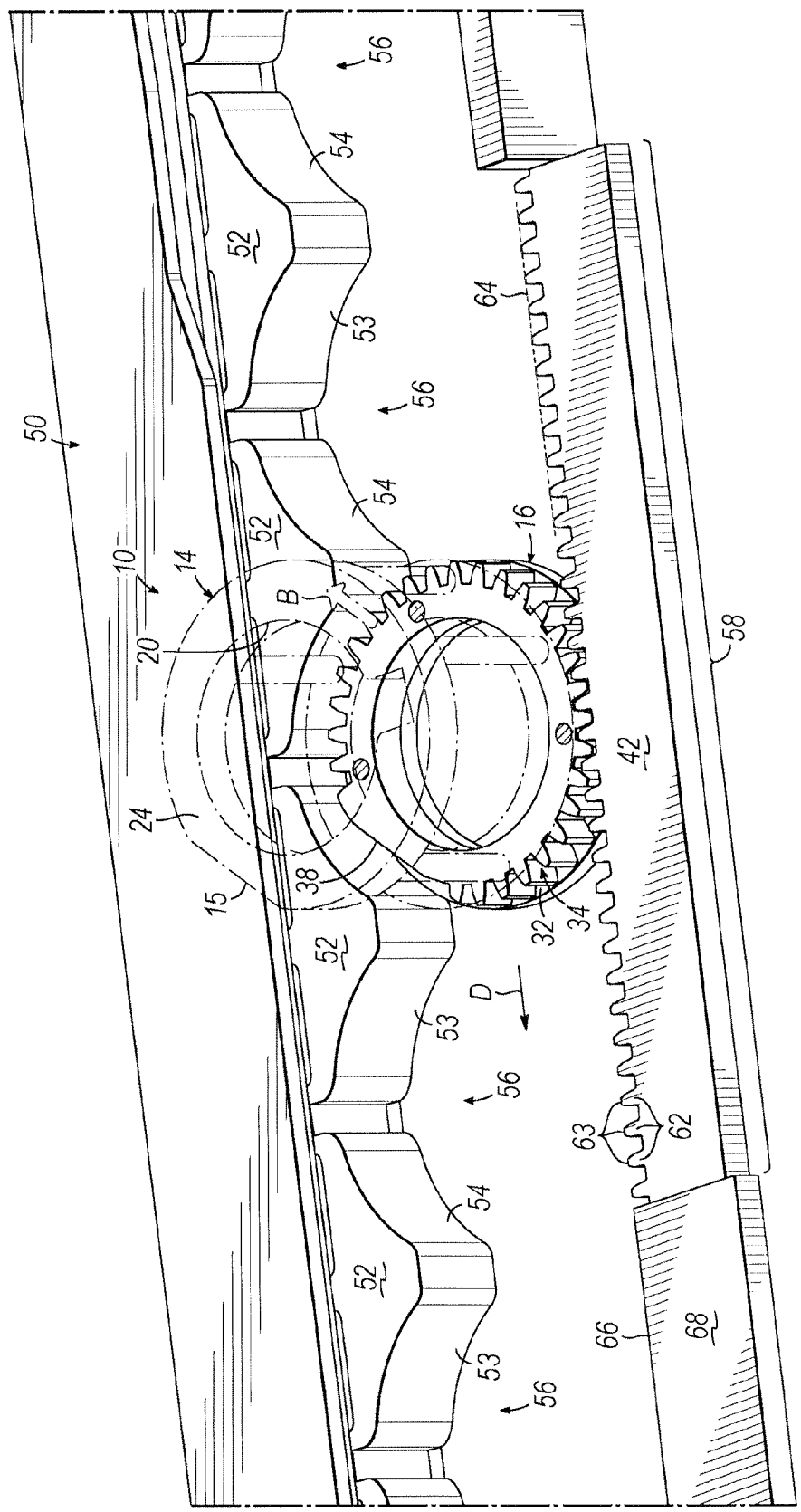
FIG. 9 is an isometric view of the puck of FIGS. 7 & 8 in engagement with the elongated rack between its ends and showing the rack and the linear star conveyor.
Figure 10:
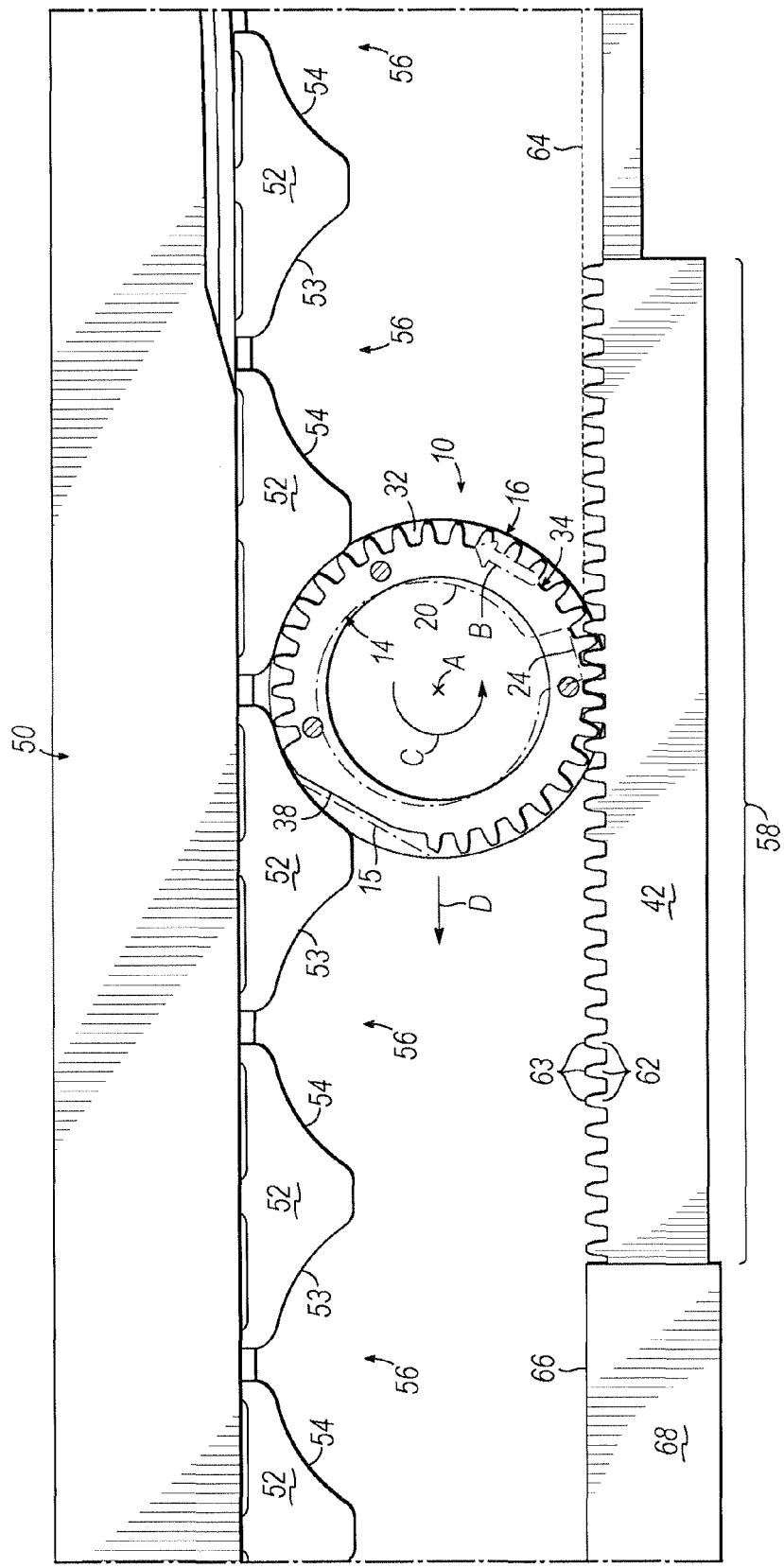
FIG. 10 is a top plan view of the puck in FIG. 9.
Figure 11:
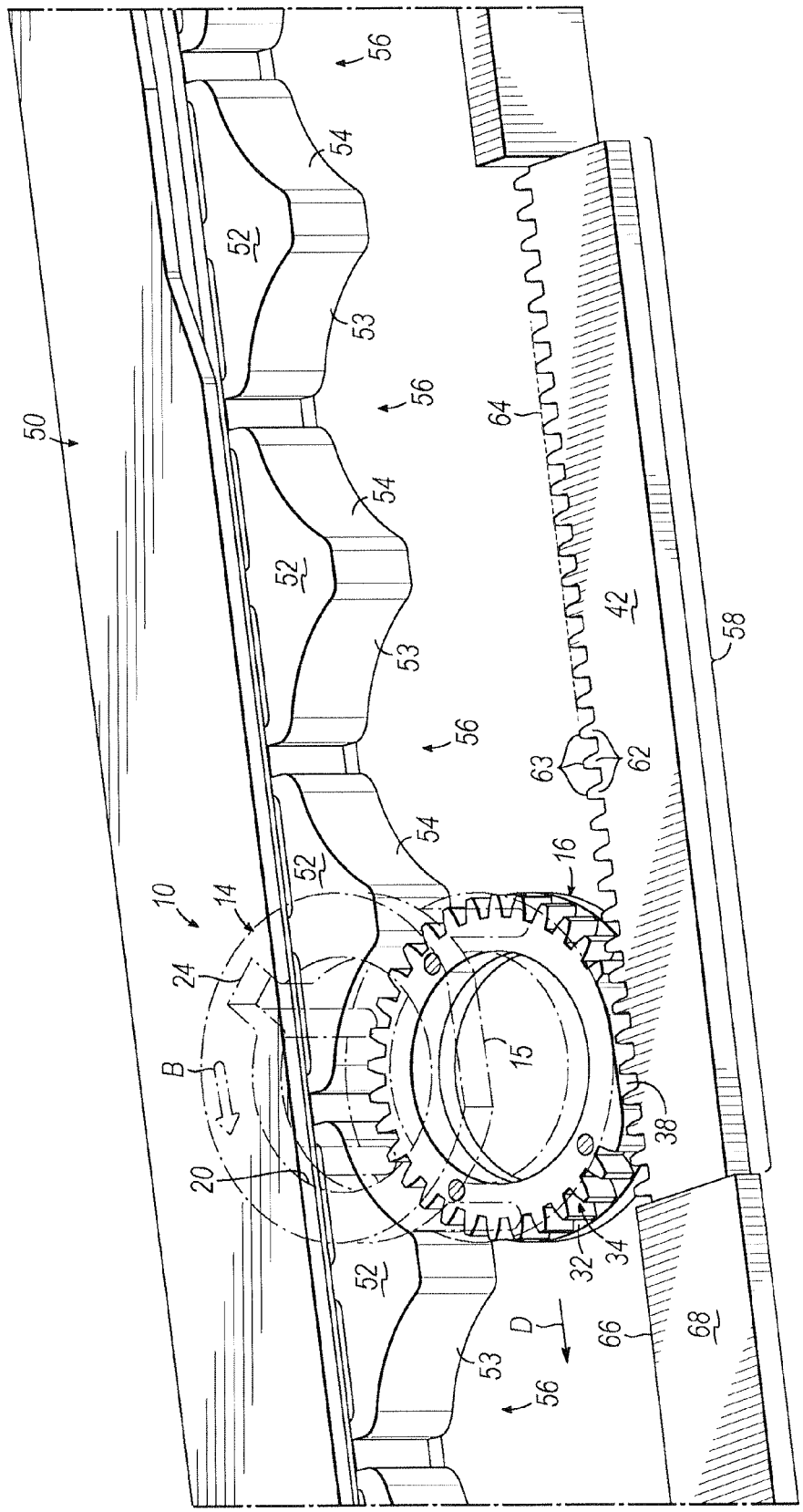
FIG. 11 is an isometric view of the puck of FIGS. 7-10 but showing the puck nearing the end of the orientation rack.
Figure 12:
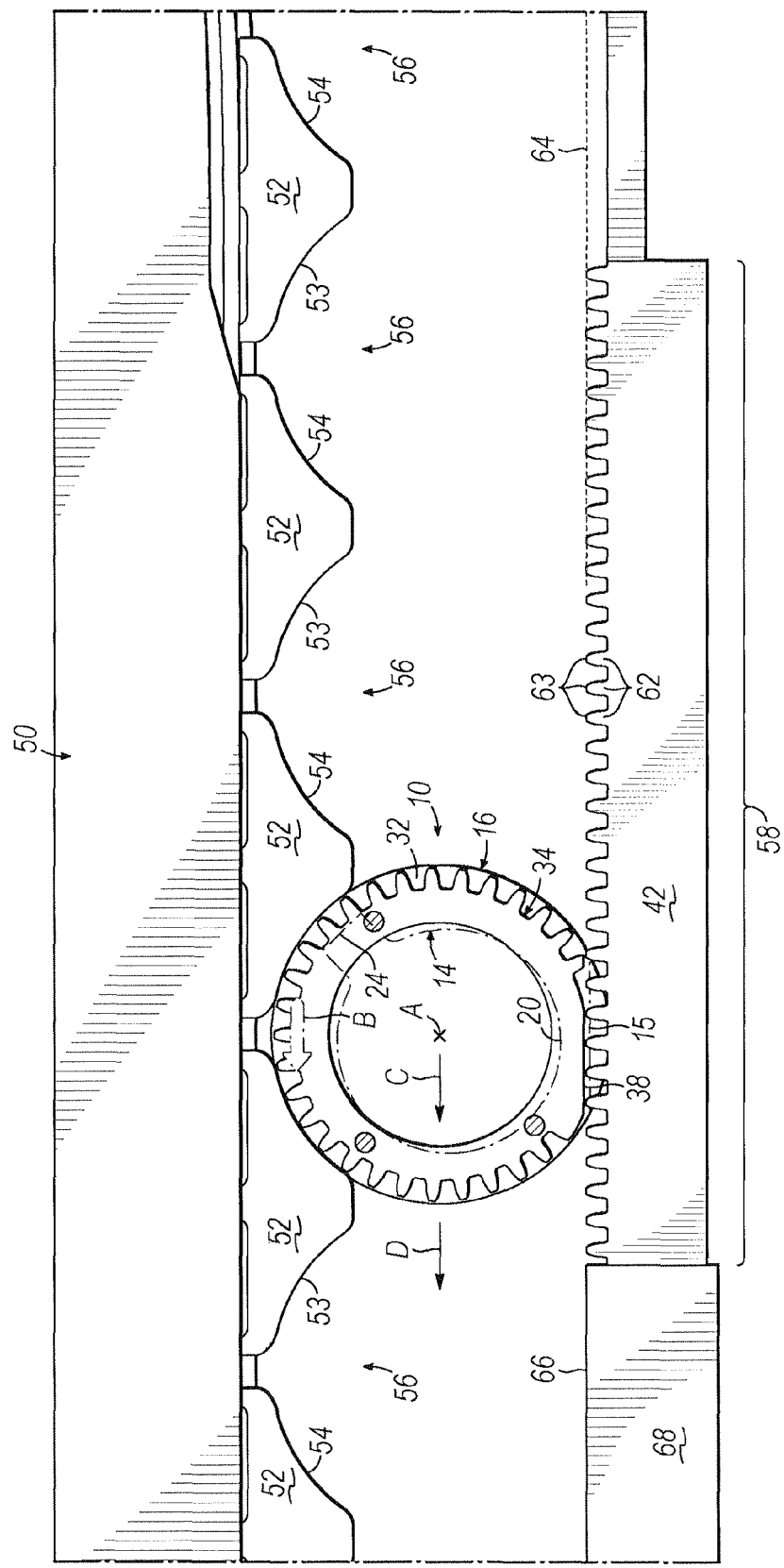
FIG. 12 is a top plan view of the puck of FIG. 11.

FIGS. 9 & 10 are an isometric representation of puck 10 in a position between that of FIGS. 7, 8 and 11, 12. Nevertheless, puck 10 is always finally oriented angularly as depicted in FIGS. 13, 14 however the puck 10 was initially oriented as it engaged teeth 62.

FIGS. 15-19 illustrate another angular rotation of puck 10, as it approaches section 58. In this case, it will be noticed that bridge 38 is in a retarded angular position, but as a result of position as in FIG. 17, it engages crests 63 earlier than that engagement shown in the prior FIGS, up to FIG. 15. Nevertheless, the angular orientation of puck 10 remains the same as in FIG. 17 through its downstream position as in FIG. 19, where puck 10 (and any cup 12) is angularly-oriented in the same position as in the preceding FIGS.

Figure 20:
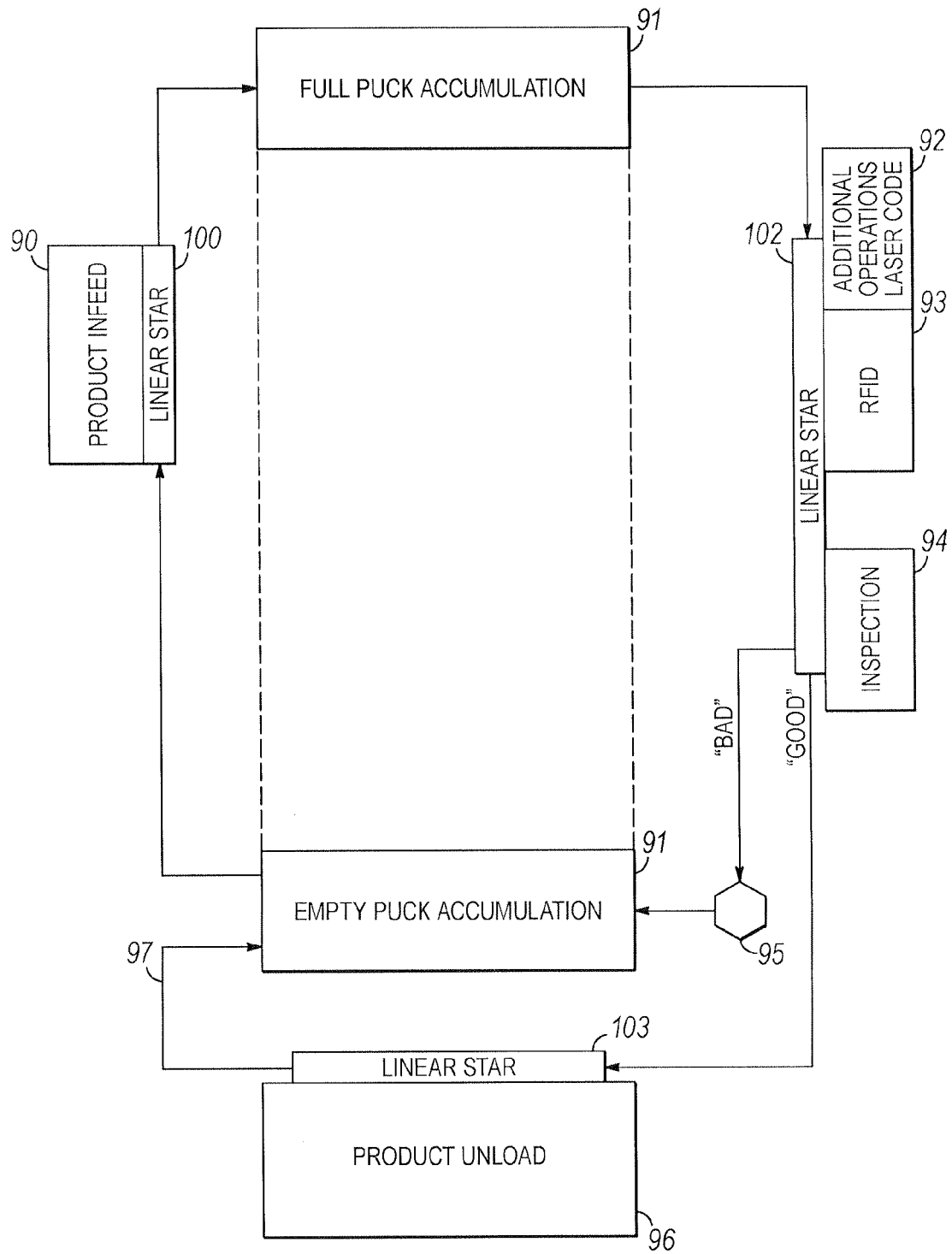
FIG. 20 is a top plan view of a floor plan of an illustrative asymmetric article handling process illustrating varying positions and uses of the preferred embodiment of the invention in such a process.

FIG. 20 illustrates a sample floor plan view of an asymmetric article handling system wherein the article may be a container, and including a filler or product infeed 90, an accumulation section 91, printing (dating) section 92, RFID section 93, vision inspection system 94, reject system 95, carton system 96 and empty puck return line 97.

An orientation apparatus as described above can be advantageously used at locations 100, 102 and 103 consistent with the above description and noting location 102 is extended through multiple functional stations. Pucks, like pucks 10, are used to carry oriented articles into, through or from filler 90, into through and from sections 92-95 and into cartoning or packaging station 96 where orientation of asymmetric articles is also important for packaging orientation. Angular orientation is important also at or from filler 90, and at stations 92-95 to insure consistency.

Finally, it will be appreciated that pucks, with asymmetric articles therein, can be accumulated in random angular orientation and in mass volume, adjacent one another, then removed from accumulation and easily angularly rotated for further handling. The circular peripheries of the pucks 10, such as the upper and lower puck plates 14, 16 facilitate engagement of pucks randomly with each other.

This invention is useful in handling many varied asymmetrical articles in particular where accumulation or angular position at process stations is critical.

These and other objectives and advantages will become readily apparent to those of ordinary skill in the art without departing from the scope of the invention and applicant intends to be bound only by the claims appended hereto.

What is claimed is:

1. An article handing apparatus comprising a puck for handling articles of asymmetric configuration wherein said puck includes:
    an upper puck plate having a recess for receiving an article and formed to prevent article rotation in said plate;
    a lower puck plate secured to said upper puck plate for rotation therewith;
    said plates spaced away from each other,
    wherein said lower puck plate includes a circular periphery and includes a recessed tooth rack in a circular configuration recessed within said periphery,
    wherein said tooth rack has ends defined by two respective rack teeth and a bridge surface extending from a base of one of said end teeth toward a crest of another of said end teeth, and
    wherein said bridge surface comprises plural bridge sections with selected sections having respective inclinations differing from inclinations of other sections.

2. An article handling apparatus comprising an article holding circular puck, said puck comprising:
    an elongated circularly disposed rack comprised of a plurality of teeth and a non-toothed bridge extending between ends of said rack;
    said bridge having a bridge surface facing radially outwardly and inclined in a radial outward direction from a base of a tooth at one end of said rack toward a crest of another tooth at another end of said rack,
    wherein said bridge surface comprises plural bridge sections with selected sections having respective inclinations differing from inclinations of other sections.

3. Apparatus as in claim 2 wherein said circularly disposed rack and said bridge surface is recessed within a periphery of said puck.

4. An article orienting apparatus comprising: a circular puck;
    a recessed gear in the puck and including an inclined bridge between teeth of the gear;
    and an element in the puck configured to hold an asymmetric article in the puck for rotation therewith,
    wherein the bridge has a radially outward facing surface comprising at least two inclinations at an angle to each other.

5. A method of orienting, around a vertical axis, an asymmetric article including:
    capturing said article in an upper plate of a puck;
    transporting said puck in a downstream direction;
    engaging recessed puck teeth in a portion of said puck with teeth of an elongated rack disposed in the path of said recessed puck teeth and turning said puck and article;
    disengaging said recessed puck teeth from said elongated rack teeth and retaining said puck and article in a fixed angular orientation corresponding to said disengagement of said teeth; and
    thereafter holding said puck and article against further rotation while transporting said puck and articles in a downstream direction,
    and further including driving said puck along said elongated rack with a linear star conveyor engaging one side of said puck, opposite said elongated rack, wherein said puck is spaced from immediately proximate pucks on both sides of said pucks.

6. A method as in claim 5 including the step of holding sequential pucks apart at a selected pitch while said sequential pucks are transported downstream, rotated and angularly oriented.

7. A method of orienting an asymmetric article about an axis and comprising the steps of:
- carrying an article in a puck having a recessed circular gear of radially extending teeth;
- engaging said teeth on an elongated orientation rack and turning said puck; alternatively engaging crests of teeth on said rack with a surface of a bridge formed in said gear and preventing further rotation of said puck, said method further comprising
- the step of transporting said puck in a downstream direction in engagement with said rack by a linear star conveyor while said puck rotates and while said puck moves downstream without rotation.

8. A method of orienting an asymmetric article about an axis and comprising the steps of:
- carrying an article in a puck having a recessed circular gear of radially extending teeth;
- engaging said teeth on an elongated orientation rack and turning said puck; engaging crests of teeth on said rack with a surface of a bridge formed in said gear; and
- preventing further rotation of said puck, said method further comprising
- engaging crests of teeth on said rack with an inclined surface of said bridge and engaging a lesser inclined surface of said bridge on said rack, then engaging a more steeply inclined surface of said bridge on said rack.

9. An article orienting apparatus including in combination:
- a circular puck;
- a recessed gear in said puck having radially oriented teeth and including an inclined bridge between two of said teeth;
- an elongated rack comprised of teeth for engaging said radially oriented teeth of said recessed gear as said puck is moved along said rack;
- an element in the puck configured to hold an asymmetric article in the puck for rotation therewith; and
- a linear star conveyor engaging and driving said puck along said rack.

10. Apparatus as in claim 9 wherein said bridge is engageable with crests of teeth of said elongated rack to inhibit rotation of said puck when said puck is moved along said rack by said conveyor and said bridge is engaged with said crests.

11. Apparatus as in claim 9 wherein said puck is rotated when said puck is moved by said linear star conveyor along said elongated rack when said radially oriented teeth of said puck are operatively engaged with said teeth of said elongated rack.

* * * * *

UNITED STATES PATENT AND TRADEMARK OFFICE
CERTIFICATE OF CORRECTION

PATENT NO. : 9,073,695 B2
APPLICATION NO. : 13/872454
DATED : July 7, 2015
INVENTOR(S) : Matthew R. Lukes et al.

Page 1 of 1

It is certified that error appears in the above-identified patent and that said Letters Patent is hereby corrected as shown below:

In the Specification:

Column 1, line 41, "accumulate" should be ---accumulated---.
Column 1, line 56, "nor" should be ---or---.
Column 3, line 29, "is" should be ---are---.
Column 4, line 10, "of the puck of the FIGS." should be ---of the puck of FIGS.---.
Column 4, line 41, "article" should be ---articles---.
Column 5, line 13, after the word "necessarily" insert --,--.
Column 5, line 16, after the word "as" insert --will--.
Column 5, line 49, "results" should be ---result---.
Column 6, line 7, "is" should be ---are---.
Column 6, line 24, after the word "fed" delete "to".

In the Claims:

Column 8, line 33, "is" should be ---are---.

Signed and Sealed this
Seventeenth Day of May, 2016

Michelle K. Lee
*Director of the United States Patent and Trademark Office*